US012451636B2

(12) United States Patent
Nishijima

(10) Patent No.: US 12,451,636 B2
(45) Date of Patent: Oct. 21, 2025

(54) TERMINAL UNIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 305 days.

(21) Appl. No.: 18/270,802

(22) PCT Filed: Dec. 16, 2021

(86) PCT No.: PCT/JP2021/046587
§ 371 (c)(1),
(2) Date: Jul. 3, 2023

(87) PCT Pub. No.: WO2022/149432
PCT Pub. Date: Jul. 14, 2022

(65) Prior Publication Data

US 2024/0063566 A1 Feb. 22, 2024

(30) Foreign Application Priority Data

Jan. 6, 2021 (JP) ................................ 2021-001040

(51) Int. Cl.
*H01R 13/11* (2006.01)

(52) U.S. Cl.
CPC ................................ *H01R 13/111* (2013.01)

(58) Field of Classification Search
CPC ....... H01R 13/111; H01R 13/11; H01R 13/18; H01R 13/04
(Continued)

(56) References Cited

U.S. PATENT DOCUMENTS 6,340,319 B1 1/2002 Matsunaga
2013/0109250 A1 5/2013 Haga
(Continued)

FOREIGN PATENT DOCUMENTS

JP S61-038780 U1 3/1986
JP 2014-093172 A 5/2014
(Continued)

OTHER PUBLICATIONS

International Search Report issued on Feb. 1, 2022 for WO 2022/149432 A1 (6 pages).

*Primary Examiner* — Tulsidas C Patel
*Assistant Examiner* — Jeffrey Mountain
(74) *Attorney, Agent, or Firm* — Venjuris, P.C.

(57) ABSTRACT

In a terminal unit, a male terminal includes a columnar connecting portion having a tapered shape, and a female terminal includes a tubular connecting portion and a resilient member. A facing gap between a first peripheral wall portion and a second peripheral wall portion constituting the tubular connecting portion becomes gradually smaller in an inserting direction of the columnar connecting portion. The first or second peripheral wall portion, includes a contact point portion. With the columnar connecting portion and the tubular connecting portion concentrically arranged, a tip part of the columnar connecting portion is insertable into the tubular connecting portion without contacting the contact point portion, and a press-fit region to be press-fit to the
(Continued)

contact point portion is provided on a part of the columnar connecting portion closer to the base end side than the tip part.

4 Claims, 8 Drawing Sheets

(58) Field of Classification Search
USPC .......................................................... 439/816
See application file for complete search history.

(56) References Cited

U.S. PATENT DOCUMENTS

| | | | | |
|---|---|---|---|---|
| 2018/0337479 | A1 | 11/2018 | Machida et al. | |
| 2020/0403342 | A1 | 12/2020 | Nishijima | |
| 2021/0143561 | A1 | 5/2021 | Nishijima | |
| 2022/0285871 | A1* | 9/2022 | Nishijima | H01R 13/111 |
| 2022/0294142 | A1* | 9/2022 | Nishijima | H01R 13/15 |
| 2023/0170637 | A1* | 6/2023 | Nishijima | H01R 13/04 439/816 |
| 2024/0063566 | A1* | 2/2024 | Nishijima | H01R 13/193 |

FOREIGN PATENT DOCUMENTS

| | | | |
|---|---|---|---|
| JP | 2016-024901 | A | 2/2016 |
| JP | 2020-149852 | A | 9/2020 |

* cited by examiner

TERMINAL UNIT

CROSS REFERENCE TO RELATED APPLICATIONS

This application is a national phase of PCT application No. PCT/JP2021/046587, filed on 16 Dec. 2021, which claims priority from Japanese patent application No. 2021-001040, filed on 6 Jan. 2021, all of which are incorporated herein by reference.

TECHNICAL FIELD

The present disclosure relates to a terminal unit.

BACKGROUND

Patent Document 1 discloses a terminal unit for realizing an electrical connection structure by a male terminal including a substantially cylindrical columnar connecting portion called a pin terminal or the like and a female terminal including a substantially hollow cylindrical tubular connecting portion called a sleeve terminal or the like. A resilient contact piece folded rearward from a tip opening is provided inside the tubular connecting portion of the female terminal. By a resilient restoring force of this resilient contact piece, a contact point portion provided on an end part of the resilient contact piece is pressed by the columnar connecting portion of the male terminal and the male and female terminals are held in a contact state to achieve electrical connection.

PRIOR ART DOCUMENT

Patent Document

Patent Document 1: JP 2016-024901 A

SUMMARY OF THE INVENTION

Problems to be Solved

In the female terminal of such a conventional structure, the resilient contact piece is pressed by the columnar connecting portion of the male terminal, whereby the male and female terminals are held in the contact state. Thus, an improvement of a contact pressure between the male and female terminals has been limited if only a spring force of the resilient contact piece is used. Further, in inserting the columnar connecting portion of the male terminal into the tubular connecting portion of the female terminal, the resilient contact piece of the tubular connecting portion moves while rubbing a surface of the columnar connecting portion. Therefore, the plating of the columnar connecting portion and the tubular connecting portion may be scraped off, leading to a problem of an increase in contact resistance and the like, by repeatedly inserting and withdrawing the male terminal into and from the female terminal.

Accordingly, a terminal unit of a novel structure is disclosed which can suppress the plating scraping-off of a columnar connecting portion and a tubular connecting portion while improving a contact pressure of the tubular connecting portion of a female terminal with a columnar connecting portion of a male terminal.

Means to Solve the Problem

The present disclosure is directed to a terminal unit with a male terminal and a female terminal, the male terminal including a columnar connecting portion extending while having a circular cross-section, the columnar connecting portion having a tapered shape gradually reduced in diameter toward a tip side, the female terminal including a tubular connecting portion to be conductively connected to the columnar connecting portion of the male terminal and having a first peripheral wall portion and a second peripheral wall portion arranged to face each other, and a resilient member for biasing the first and second peripheral wall portions in mutually approaching directions, the first and second peripheral wall portions being displaceable away from each other against a biasing force of the resilient member, a facing gap between the first and second peripheral wall portions becoming gradually smaller from a base end side toward a tip side of the tubular connecting portion in an inserting direction of the columnar connecting portion into the tubular connecting portion, at least one of the first and second peripheral wall portions including a contact point portion located between the base end side and the tip side and projecting radially inward, and a tip part of the columnar connecting portion having an outer diameter to be insertable into the tubular connecting portion without contacting the contact point portion with the columnar connecting portion and the tubular connecting portion concentrically arranged, a press-fit region to be press-fit to the contact point portion being provided on a part of the columnar connecting portion closer to the base end side than the tip part.

Effect of the Invention

According to the terminal unit of the present disclosure, it is possible to suppress the plating scraping-off of a columnar connecting portion and a tubular connecting portion while improving a contact pressure of the tubular connecting portion of a female terminal with a columnar connecting portion of a male terminal.

DETAILED DESCRIPTION TO EXECUTE THE INVENTION

Description of Embodiments of Present Disclosure

Figure 1:
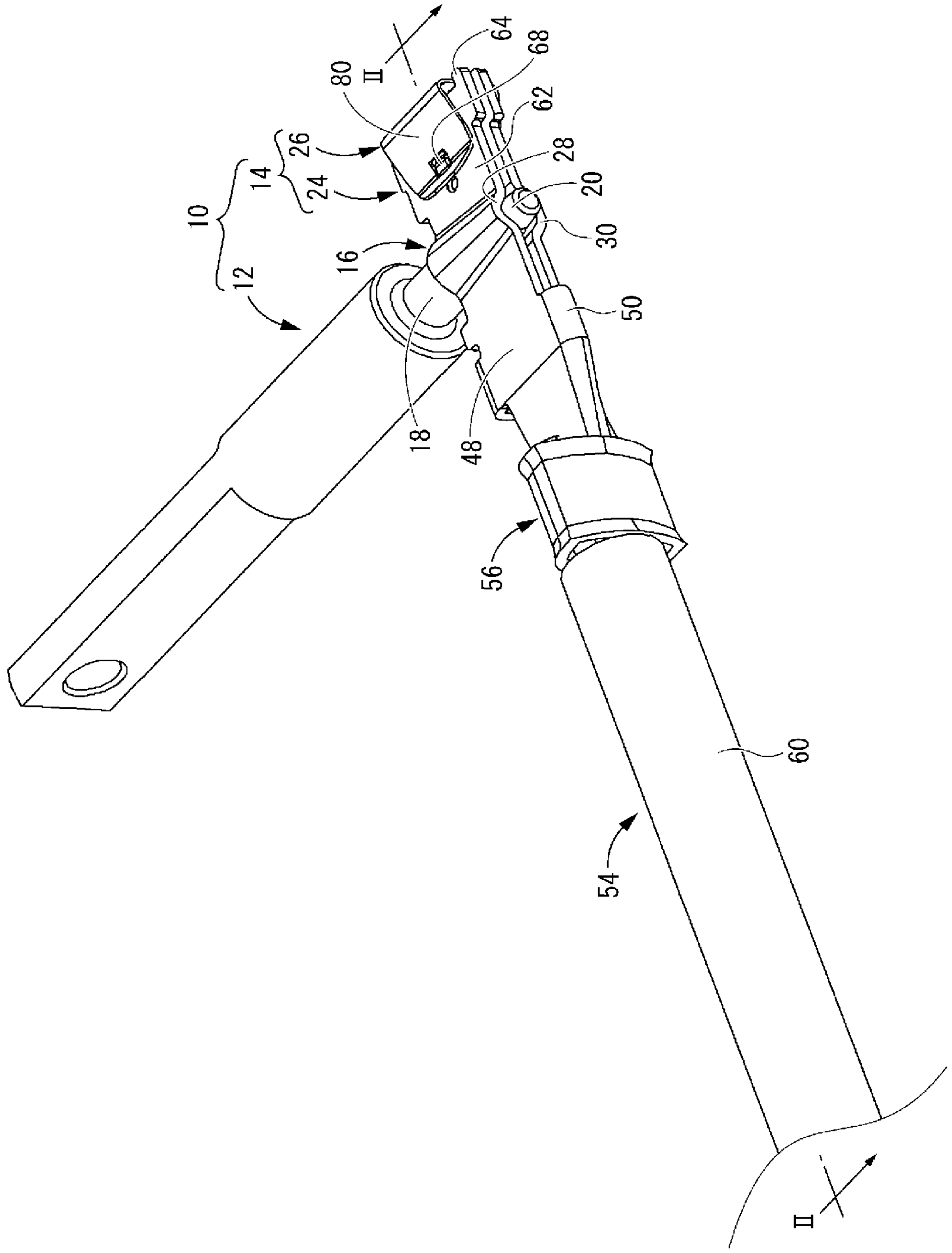
FIG. 1 is a perspective view of a terminal unit according to one embodiment showing a state where a male terminal is inserted in a female terminal.

First, embodiments of the present disclosure are listed and described.

(1) The terminal unit of the present disclosure is provided with a male terminal and a female terminal, the male terminal including a columnar connecting portion extending while having a circular cross-section, the columnar connecting portion having a tapered shape gradually reduced in diameter toward a tip side, the female terminal including a tubular connecting portion to be conductively connected to the columnar connecting portion of the male terminal and having a first peripheral wall portion and a second peripheral wall portion arranged to face each other, and a resilient member for biasing the first and second peripheral wall portions in mutually approaching directions, the first and second peripheral wall portions being displaceable away from each other against a biasing force of the resilient member, a facing gap between the first and second peripheral wall portions becoming gradually smaller from a base end side toward a tip side of the tubular connecting portion in an inserting direction of the columnar connecting portion into the tubular connecting portion, at least one of the first and second peripheral wall portions including a contact point portion located between the base end side and the tip side and projecting radially inward, and a tip part of the columnar connecting portion having an outer diameter to be insertable into the tubular connecting portion without contacting the contact point portion with the columnar connecting portion and the tubular connecting portion concentrically arranged, a press-fit region to be press-fit to the contact point portion being provided on a part of the columnar connecting portion closer to the base end side than the tip part.

According to the terminal unit of the present disclosure, the tubular connecting portion of the female terminal to be conductively connected to the columnar connecting portion of the male terminal includes the first and second peripheral wall portions arranged to face each other. The first and second peripheral wall portions are biased in the mutually approaching directions by the resilient member and displaceable away from each other against the biasing force. Accordingly, in press-fitting the columnar connecting portion of the male terminal into the tubular connecting portion of the female terminal, the first and second peripheral wall portions are displaced away from each other against the biasing force of the resilient member, thereby allowing the columnar connecting portion to be press-fit into the tubular connecting portion. After the columnar connecting portion of the male terminal is press-fit, the first and second peripheral wall portions of the tubular connecting portion of the female terminal are maintained in a state biased in the mutually approaching directions by the biasing force of the resilient member. Thus, a press-contact state between the male and female terminals can be stably maintained. Particularly, since a press-contact force of the tubular connecting portion of the female terminal to the columnar connecting portion of the male terminal can be arbitrarily set by adjusting the resilient member for biasing the first and second peripheral wall portions in the mutually approaching directions, the press-contact force between the male and female terminals can be set with a large degree of freedom.

In addition, the columnar connecting portion of the male terminal has the tapered shape gradually reduced in diameter toward the tip side. In the tubular connecting portion of the female terminal, the facing gap between the first and second peripheral wall portions becomes gradually smaller from the base end side toward the tip side of the tubular connecting portion in the inserting direction of the columnar connecting portion into the tubular connecting portion. That is, the tubular connecting portion also has a tapered tubular inner surface corresponding to the columnar connecting portion. Further, at least one of the first and second peripheral wall portions of the female terminal is provided with the contact point portion located between the base end side and the tip side and projecting radially inward.

With the columnar connecting portion and the tubular connecting portion concentrically arranged, the tip part of the columnar connecting portion has the outer diameter to be insertable into the tubular connecting portion without contacting the contact point portion, and the press-fit region to be press-fit to the contact point portion is provided on the part of the columnar connecting portion closer to the base end side than the tip part. In this way, the contact of the columnar connecting portion of the male terminal and the tubular connecting portion of the female terminal can be suppressed until the press-fit region of the columnar connecting portion comes into contact with and is press-fit to the contact point portion. Further, since the press-fit region of the columnar connecting portion contacts the contact point portion of the female terminal or the tapered inner surface of the first or second peripheral wall portion facing the contact point portion, it is avoided that the surface on the side of the columnar connecting portion and the surface on the side of the tubular connecting portion rub and move against each other with a high contact pressure. As a result, even if the male terminal is repeatedly inserted into and withdrawn from the female terminal, the plating scraping-off of the columnar connecting portion and the tubular connecting portion can be suppressed. Therefore, the terminal unit of the present disclosure can achieve both an improvement in the contact pressure of the tubular connecting portion of the female terminal with the columnar connecting portion of the male terminal and the suppression of the plating scraping-off of the columnar connecting portion and the tubular connecting portion.

Note that since the columnar connecting portion of the male terminal can be inserted into the tubular connecting portion of the female terminal without being press-fit until the press-fit region of the columnar connecting portion comes into contact with and is press-fit to the contact point portion, a fitting distance between the male and female terminals can be set to be short. Therefore, in the case of adopting the terminal unit of the present disclosure for a connector unit formed such that a male connector accommodating a male terminal and a female connector accommodating a female terminal are connected while being fastened by a bolt, a connection bolt can be shortened and miniaturization and the shortening of a bolt tightening time can also be achieved.

(2) Preferably, both the first and second peripheral wall portions have an inner surface having an arcuate cross-section, and the contact point portion in the form of an arcuate projection projecting radially inward while extending in a circumferential direction of the inner surface is provided on the inner surface of at least one of the first and second peripheral wall portions. Each of the first and second peripheral wall portions has the inner surface having an arcuate cross-section, and at least one inner surface is provided with the contact point portion in the form of an arcuate projection projecting radially inward while extending in the circumferential direction of this inner surface. Therefore, the columnar connecting portion of the male terminal press-fit into the tubular connecting portion of the female terminal can be pressed into contact with the contact point portion in the form of an arcuate projection with a high contact pressure in a wide range of the outer peripheral surface of the columnar connecting portion, and a wide contact area between the male and female terminals can be stably secured.

(3) Preferably, in (2) described above, the contact point portion in the form of an arcuate projection is provided on the inner surface of one of the first and second peripheral wall portions, and linear contact portions projecting radially inward while extending in an axial direction of the tubular connecting portion are provided at a plurality of positions separated in the circumferential direction on the inner surface of the other of the first and second peripheral wall portions. The linear contact portions projecting on the inner surface of the other of the first and second peripheral wall portions and extending in the axial direction are pressed into line contact with the columnar connecting portion of the male terminal at the plurality of positions separated in the circumferential direction. In this way, even if a rocking motion of a wire is transmitted to the male terminal, a rocking displacement of the male terminal can be hindered by the contact of the male terminal with the plurality of linear contact portions. Therefore, the rocking displacement of the male terminal can be hindered by the plurality of linear contact portions of the other of the first and second peripheral wall portions while the columnar connecting portion of the male terminal is pressed into contact with the contact point portion in the form of an arcuate projection on the one of the first and second peripheral wall portions with a high contact pressure in a wide range of the outer peripheral surface of the columnar connecting portion, and both an increase in contact area with the male terminal and stable holding of the male terminal can be achieved.

(4) Preferably, the female terminal includes a pair of tip side plate portions, the pair of tip side plate portions project radially outwardly of the tubular connecting portion from a pair of mutually facing circumferential end parts of the first and second peripheral wall portions while being separated from each other and are deflectable and deformable in mutually approaching directions, the resilient member biases the pair of tip side plate portions in the mutually approaching directions, and at least one of a pair of facing surfaces of the pair of tip side plate portions is provided with a stopper portion projecting toward the other facing surface at a position closer to the tubular connecting portion than tip parts of the tip side plate portions.

The pair of tip side plate portions projecting radially outward from the respective circumferential end parts of the first and second peripheral wall portions are separated from each other. The pair of tip side plate portions are biased in the mutually approaching directions by the resilient member. In this way, biasing forces in the mutually approaching directions can be applied to the first and second peripheral wall portions. By biasing the pair of tip side plate portions in the mutually approaching directions by the separate resilient member in this way, a biasing force in a diameter reducing direction can be applied to the tubular connecting portion of the male terminal. The pair of tip side plate portions and the first and second peripheral wall portions are displaced and separated in directions opposite to the mutually approaching directions against the biasing forces of the resilient member, thereby allowing the insertion of the columnar connecting portion of the male terminal into the tubular connecting portion. Therefore, the contact pressure of the tubular connecting portion of the female terminal with the columnar connecting portion of the male terminal can be obtained by the separate resilient member mounted on the pair of tip side plate portions, and the contact pressure of the tubular connecting portion of the female terminal with the columnar connecting portion of the male terminal can be improved as compared to the case where a contact pressure is obtained by a resilient contact piece provided in a conventional tubular connecting portion.

In addition, with the resilient member mounted on the tip side plate portions, displacements of the pair of tip side plate portions in the approaching directions by the biasing forces of the resilient member are restricted by the stopper portion provided on the tip side plate portion, the tip parts of the pair of tip side plate portions can be maintained in a separated state and it is also suppressed that an inner diameter of the tubular connecting portion becomes excessively small. Therefore, insertion resistance in inserting the columnar connecting portion into the tubular connecting portion can be reduced, and a separation distance between the tip parts of the pair of tip side plate portions during insertion can be increased. As a result, it is also possible to suppress or prevent a problem in which the tip parts of the pair of tip side plate portions contact each other due to stress relaxation or the like of a material of the pair of tip side plate portions with time, the biasing forces of the resilient member are distributed to the tip sides of the pair of tip side plate portions and the contact pressure of the tubular connecting portion with the columnar connecting portion is reduced.

(5) Preferably, the male terminal includes a columnar insulating member mounted on the tip part of the columnar connecting portion and gradually reduced in diameter toward a tip and a maximum outer diameter of the insulating member is smaller than an outer diameter of the tip part of the columnar connecting portion. Since the insulating member is mounted on the tip part of the columnar connecting portion of the male terminal, an electric shock can be prevented by suppressing a worker's contact with the tip part of the columnar connecting portion exposed from a male housing accommodating the male terminal. Further, since the insulating member has a column shape gradually reduced in diameter toward a tip and the maximum outer diameter of the insulating member is smaller than the outer diameter of the tip part of the columnar connecting portion, the outer surface of the columnar connecting portion and the inner surface of the tubular connecting portion can be more reliably brought into contact, and the occurrence of a problem in which the insulating member slides against the inner surfaces of the first and second peripheral wall portions of the female terminal to scrape off the plating is suppressed.

DETAILS OF EMBODIMENT OF PRESENT DISCLOSURE

A specific example of a terminal unit of the present disclosure is described below with reference to the drawings. Note that the present disclosure is not limited to these illustrations, but is represented by claims and intended to include all changes in the scope of claims and in the meaning and scope of equivalents.

Embodiment

Figure 2:
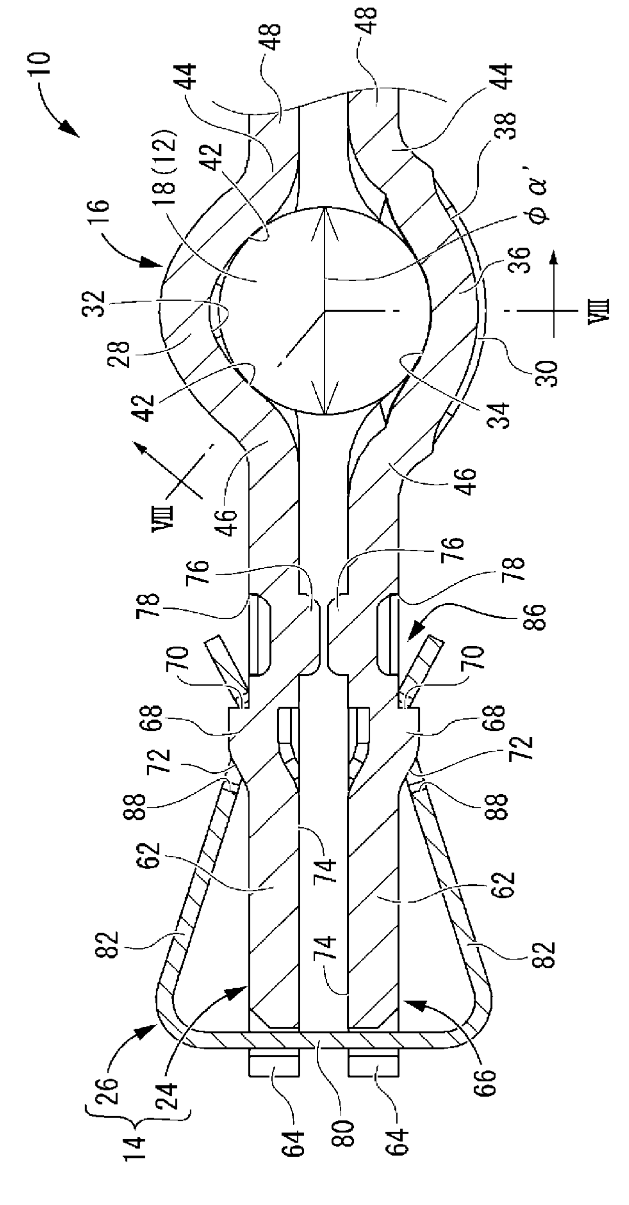
FIG. 2 is a longitudinal section along II-II in FIG. 1 enlargedly showing an essential part.

Hereinafter, a terminal unit 10 of one embodiment of the present disclosure is described using FIGS. 1 to 8. The terminal unit 20 is provided with a male terminal 12 and a female terminal 14. The female terminal 14 includes a tubular connecting portion 16, and the male terminal 12 includes a columnar connecting portion 18. By inserting the columnar connecting portion 18 of the male terminal 12 into the tubular connecting portion 16 of the female terminal 14 and bringing the inner surface of the tubular connecting portion 16 and the outer surface of the columnar connecting portion 18 into contact with each other, the male and female terminals 12, 14 are conductively connected. In the following description, a left side in FIG. 2 is referred to as a front side, and a right side of FIG. 2 is referred to as a rear side. An upper side in FIG. 2 is referred to as an upper side, and a lower side in FIG. 2 is referred to as a lower side. A left side in FIG. 7 is referred to as a left side, and a right side in FIG. 7 is referred to as a right side. Further, for a plurality of identical members, only some members may be denoted by a reference signal and the other members may not be denoted by the reference sign.

(Male Terminal 12)

The male terminal 12 includes the columnar connecting portion 18 extending while having a circular cross-section on a tip. The columnar connecting portion 18 has a tapered shape gradually reduced in diameter toward a tip side. In this embodiment, the columnar connecting portion 18 of the male terminal 12 has a minimum outer diameter ϕA (see FIG. 7) on a tip part, and the outer diameter thereof is increased up to ϕB (see FIG. 7) toward a base end side. After the outer diameter reaches ϕB, the columnar connecting portion 18 extends straight with the constant outer diameter ϕB. That is, a part of the columnar connecting portion 18 where the outer diameter changes from ϕA to ϕB is a tapered portion 19*a*, and the outer peripheral surface of a part having the constant outer diameter ϕB is a straight portion 19*b*. Note that the male terminal 12 is not limited as long as including the tapered columnar connecting portion 18, and an end part of the male terminal 12 opposite to the columnar connecting portion 18 may be fixed to a terminal portion of a device, for example, by a bolt or the like or may be fixed to a wire.

(Insulating Member 20)

Figure 3:
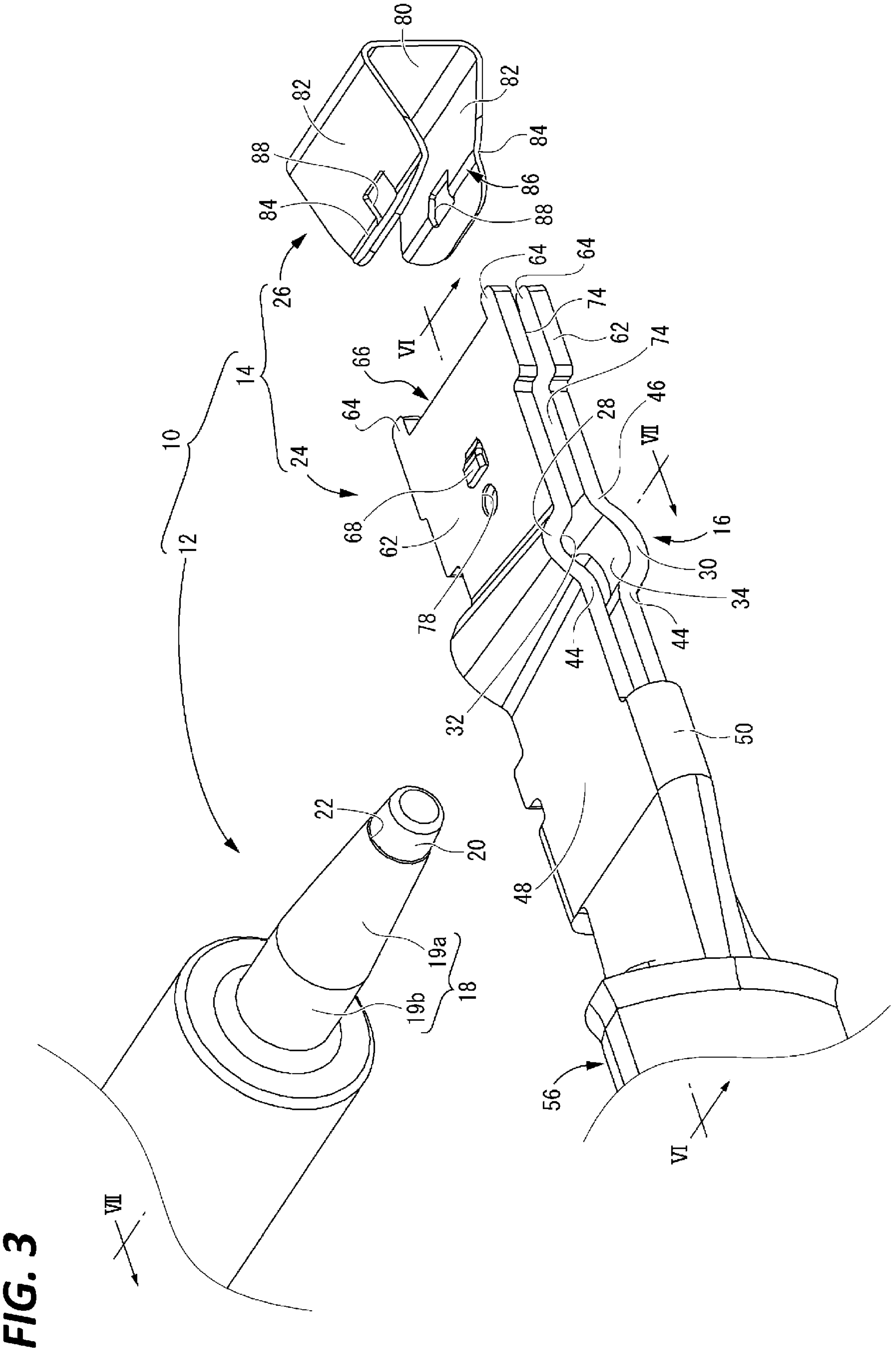
FIG. 3 is an exploded perspective view of the terminal unit shown in FIG. 1.
Figure 4:
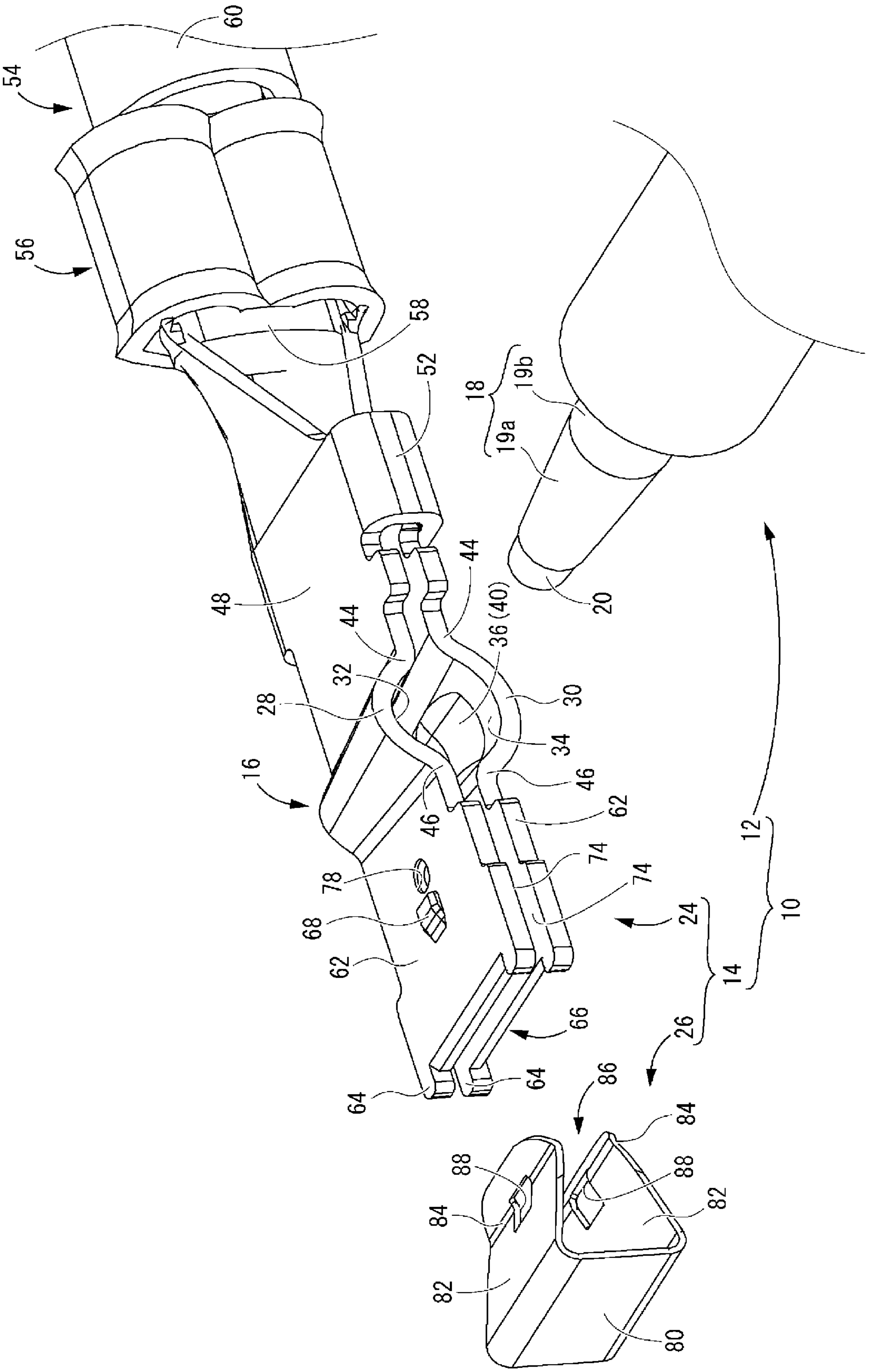
FIG. 4 is an exploded perspective view of the terminal unit shown in FIG. 1 from another angle.

In the male terminal 12, a columnar insulating member 20 gradually reduced in diameter toward a tip is mounted on the tip part of the columnar connecting portion 18. The insulating member 20 is electrically insulating and, for example, formed of synthetic resin. The insulating member 20 has a minimum outer diameter ϕC (see FIG. 7) on the tip and a maximum outer diameter ϕD (see FIG. 7) on a base end. The outer diameter ϕD on the base end of the insulating member 20 is smaller than the outer diameter ϕA of the tip part of the columnar connecting portion 18. In this way, an annular step surface 22 is formed between the columnar connecting portion 18 and the insulating member 20 as shown in FIG. 3 and the like.

(Female Terminal 14)

The female terminal 14 is configured by assembling a clip spring 26 as a resilient member with a female terminal fitting 24. The female terminal fitting 24 is formed by press-working a metal flat plate substantially in the form of a strip as a whole into a predetermined shape. Copper, copper alloy, aluminum, aluminum alloy or the like having low electrical resistance can be adopted as a metal for constituting the metal flat plate. The female terminal fitting 24 includes the aforementioned tubular connecting portion 16.

(Tubular Connecting Portion 16)

The tubular connecting portion 16 has a substantially hollow cylindrical shape tapered as a whole and is open on both sides in a lateral direction. That is, an axial direction of the tubular connecting portion 16 is the lateral direction. As described later, an inserting direction of the columnar connecting portion 18 into the tubular connecting portion 16 is a direction from right to left, and the tubular connecting portion 16 is gradually reduced in diameter from a base end side (right side) toward a tip side (left side) in this inserting direction. Note that a taper angle $\theta_1$ (see FIG. 7) of the tubular connecting portion 16 is substantially equal to a taper angle $\theta_2$ (see FIG. 7) in the tapered portion 19*a* of the columnar connecting portion 18.

That is, the taper angles $\theta_1$ and $\theta_2$ need not be strictly equal. For example, the taper angle $\theta_2$ of the tapered portion 19*a* may be slightly smaller than the taper angle $\theta_1$ of the tubular connecting portion 16. For example, the taper angle $\theta_2$ of the tapered portion 19*a* is 0.8 times or more as large as the taper angle $\theta_1$ of the tubular connecting portion 16. Further, the taper angle $\theta_2$ of the tapered portion 19*a* may be slightly larger than the taper angle $\theta_1$ of the tubular connecting portion 16. For example, the taper angle $\theta_2$ of the tapered portion 19*a* is 1.1 times or less as large as the taper angle $\theta_1$ of the tubular connecting portion 16. The taper angle $\theta_1$ of the tubular connecting portion 16 and the taper angle $\theta_2$ of the tapered portion 19*a* are made substantially equal by being set in the above ranges, whereby a relatively large contact area between the tubular connecting portion 16 and the columnar connecting portion 18 can be secured in inserting the columnar connecting portion 18 into the tubular connecting portion 16 as described later.

The tubular connecting portion 16 includes a first peripheral wall portion 28 and a second peripheral wall portion 30 arranged to face each other in a vertical direction. In this embodiment, the first peripheral wall portion 28 is located on an upper side and the second peripheral wall portion 30 is located on a lower side. Each of the first and second peripheral wall portions 28, 30 is a substantially halved tubular body having a tapered shape, and gradually reduced in diameter from right to left as described above. In other words, a facing gap between the first and second peripheral wall portions 28, 30 becomes gradually smaller from the base end side toward the tip side of the tubular connecting portion 16 in the inserting direction of the columnar connecting portion 18 into the tubular connecting portion 16.

Figure 6:
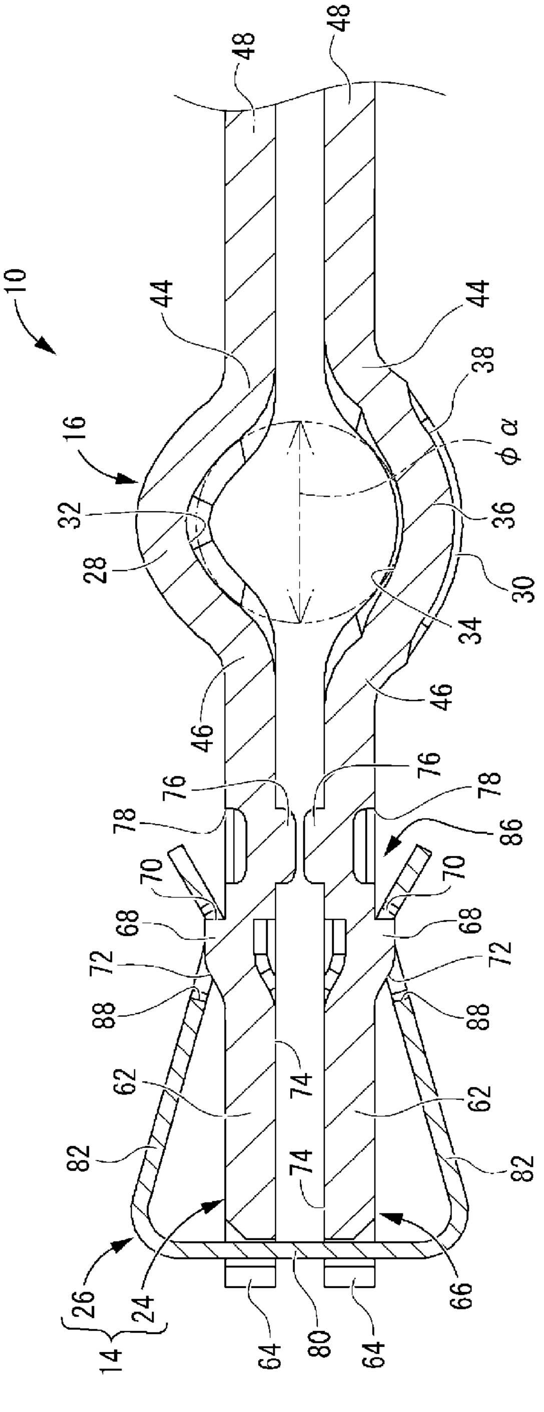
FIG. 6 is a longitudinal section along VI-VI in FIG. 3 enlargedly showing an essential part.
Figure 7:
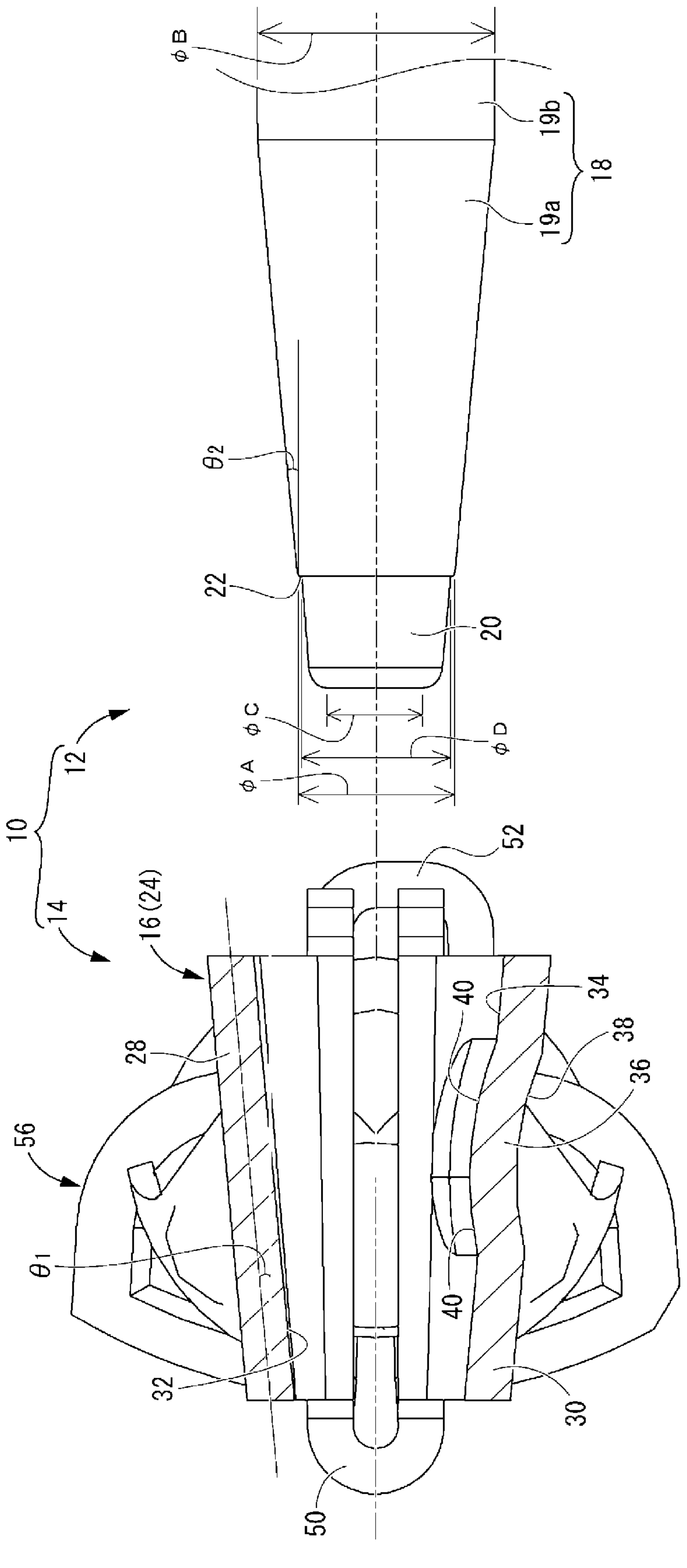
FIG. 7 is a transverse section along VII-VII in FIG. 3 enlargedly showing an essential part.

Each of the first and second peripheral wall portions 28, 30 has an inner surface 32, 34 having an arcuate cross-sectional shape in a vertical cross-section of the female terminal 14 shown in FIGS. 2 and 6. Accordingly, as also shown in FIGS. 2 and 6, the outer surface of the columnar connecting portion 18 and the inner surfaces 32, 34 of the first and second peripheral wall portions 28, 30 contact each other in inserting the columnar connecting portion 18 of the male terminal 12 into the tubular connecting portion 16 of the female terminal 14.

At least one of the inner surfaces 32, 34 of the first and second peripheral wall portions 28, 30 has a contact point portion 36 located between the base end side and the tip side in the inserting direction of the columnar connecting portion 18, i.e. between both end parts in the lateral direction, and projecting radially inward. In this embodiment, the inner surface 34 of the second peripheral wall portion 30 serving as the one surface is provided with the contact point portion 36. In this embodiment, the contact point portion 36 is in the form of an arcuate projection projecting radially inward while extending in a circumferential direction of the inner surface 34. This contact point portion 36 is formed to have dimensions in a predetermined width direction (lateral direction) and a predetermined circumferential direction in a central part in the circumferential direction of the inner surface 34. In this embodiment, the contact point portion 36 is formed by press-working the second peripheral wall portion 30, and a recess 38 open outward (downward) is formed at a position corresponding to the contact point portion 36 in the outer surface of the second peripheral wall portion 30.

Accordingly, in inserting the columnar connecting portion 18 into the tubular connecting portion 16, the contact point portion 36 and the outer surface of the columnar connecting portion 18 contact each other. In this embodiment, in FIG. 2, a curvature of the inner surface of the contact point portion 36 is set smaller than that of the outer surface of the columnar connecting portion 18. Particularly, a circumferential center of the inner surface of the contact point portion 36 in the form of an arcuate projection contacts the outer surface of the columnar connecting portion 18.

Figure 8:
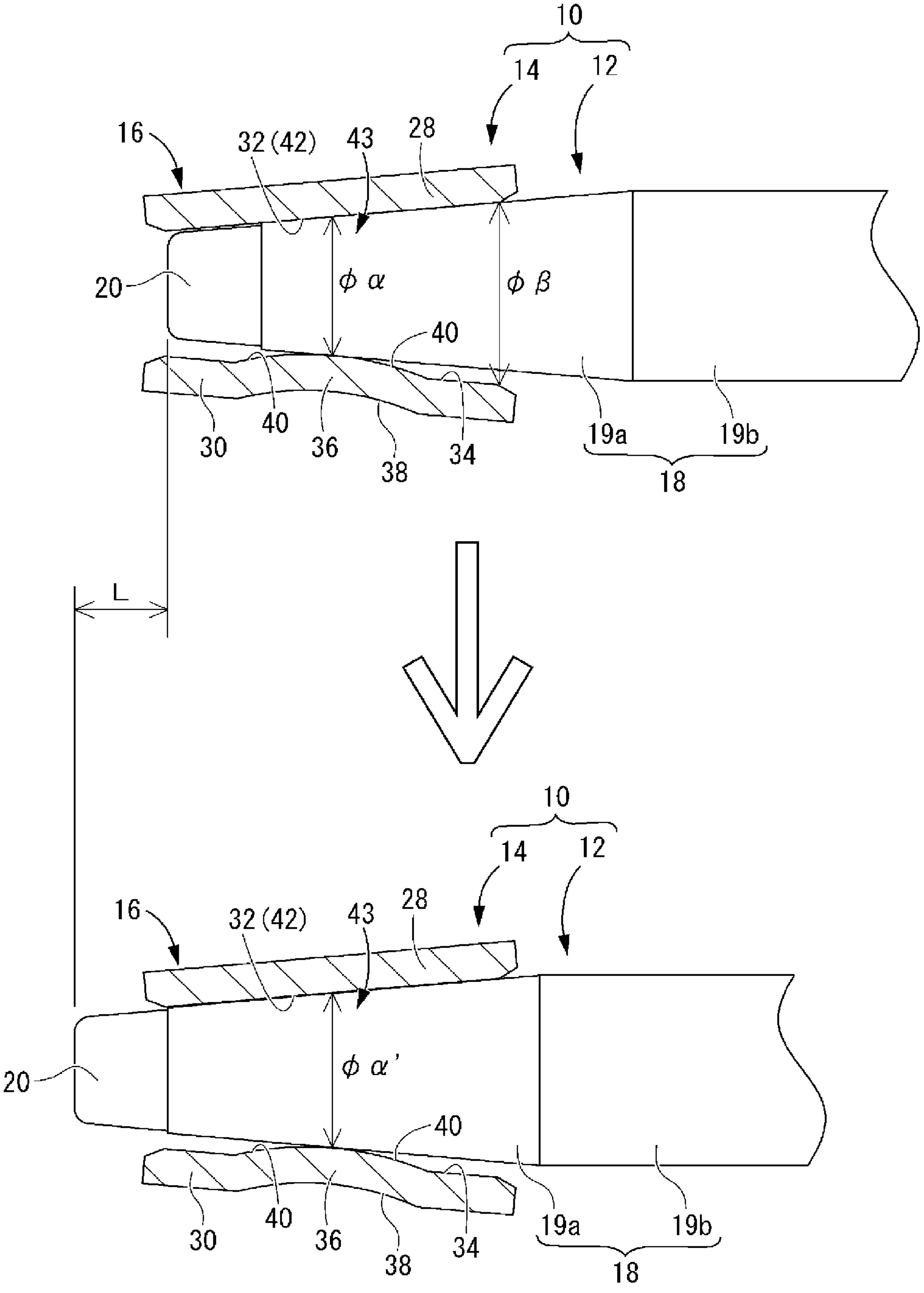
FIG. 8 is a section along VIII-VIII in FIG. 2 of the male and female terminals showing a model state in inserting the male terminal into the female terminal.

Further, as also shown in FIGS. 7 and 8, the contact point portion 36 projects most radially inward in a lateral center. In inserting the columnar connecting portion 18 into the tubular connecting portion 16, the lateral center of the contact point portion 36 and the outer surface of the columnar connecting portion 18 contact each other. Therefore, particularly the lateral center of the inner surface of the contact point portion 36 contacts the columnar connecting portion 18. In the inner surface of the contact point portion 36, both sides across the lateral center serve as curved surfaces 40, 40 gradually curved and projecting radially inwardly of the tubular connecting portion 16 toward a lateral inner side.

In a longitudinal cross-section of the female terminal 14 shown in FIGS. 2 and 6, the inner surface 32 of the first peripheral wall portion 28 may be a curved surface having a substantially constant curvature, but the inner surface 32 of the first peripheral wall portion 28 has a partially different curvature in the circumferential direction. Specifically, in the inner surface 32, parts having a smaller curvature than a circumferential central part is provided at two positions separated on both end sides in the circumferential direction from the circumferential central part. In this way, in the longitudinal cross-section of the female terminal 14 shown in FIGS. 2 and 6, the circumferential central part of the inner surface 32 has an arcuate shape having a substantially constant curvature and the parts extending substantially linearly are connected to both ends in the circumferential direction of that arc. In short, the inner surface 32 projects more radially inward at the two positions separated on the both end sides in the circumferential direction of the inner surface 32 as compared to the case where the inner surface 32 is formed into a curved surface having a substantially constant curvature.

Thus, when the columnar connecting portion 18 is inserted into the tubular connecting portion 16, the inner surface 32 of the first peripheral wall portion 28 and the outer surface of the columnar connecting portion 18 contact at the two positions separated on the both end sides in the circumferential direction from the circumferential central part of the inner surface 32. Since the first peripheral wall portion 28 extends in the axial direction (lateral direction), the first peripheral wall portion 28 and the columnar connecting portion 18 are in line contact at the two positions separated on the both end sides in the circumferential direction from the circumferential central part. In this embodiment, parts of the first peripheral wall portion 28 in which the curvature of the inner surface 32 is reduced and which contact the outer surface of the columnar connecting portion 18 at the time of inserting the columnar connecting portion 18 serves as linear contact portions 42. That is, the inner surface 32 of the first peripheral wall portion 28 serving as the other inner surface is provided with the linear contact portions 42 projecting radially inward while extending in the axial direction of the columnar connecting portion 16 at a plurality of positions (two positions) separated in the circumferential direction. Therefore, in this embodiment, the circumferential central part of the inner surface 32 and the outer surface of the columnar connecting portion 18 do not contact each other when the columnar connecting portion 18 is inserted into the tubular connecting portion 16.

Here, an inner diameter (inner diameter of a virtual circle connecting the contact point portion 36 and the linear contact portions 42, 42) $\phi\alpha$ (see FIG. 6) at the contact point portion 36 of the tubular connecting portion 16 is larger than the outer diameter $\phi A$ of the tip part, which is the minimum outer diameter of the columnar connecting portion 18. In this embodiment, the tip part of the columnar connecting portion 18 is provided with the insulating member 20, and the inner diameter $\phi\alpha$ at the contact point portion 36 is larger than the minimum outer diameter $\phi C$ and the maximum outer diameter $\phi D$ of the insulating member 20. In this way, as shown in FIG. 7 to be described later, in a state where the tubular connecting portion 16 and the columnar connecting portion 18 are concentrically arranged when viewed in the lateral direction by aligning a center axis of the tubular connecting portion 16 and that of the columnar connecting portion 18, the tip part (including the insulating member 20) of the columnar connecting portion 18 can be inserted into the tubular connecting portion 16 without contacting the contact point portion 36 and the linear contact portions 42, 42 in the tubular connecting portion 16.

Further, the inner diameter $\phi\alpha$ at the contact point portion 36 of the tubular connecting portion 16 is smaller than the maximum outer diameter $\phi B$ of the columnar connecting portion 18. As a result, in inserting the columnar connecting portion 18 into the tubular connecting portion 16 as described later, the tapered portion 19*a*, which is the outer peripheral surface of the part of the columnar connecting portion 18 where the diameter changes from $\phi A$ to $\phi B$, and the contact point portions 36 first contact each other. Thereafter, the columnar connecting portion 18 is inserted press-fit into the tubular connecting portion 16. A figure on an upper side of FIG. 8 to be described later shows a state at a point of time when the connection of the columnar connecting portion 18 and the tubular connecting portion 16 is started, i.e. the columnar connecting portion 18 is started to be inserted press-fit into the tubular connecting portion 16, and a figure on a lower side of FIG. 8 shows a state at a point of time when the connection of the columnar connecting portion 18 and the tubular connecting portion 16 is finished, i.e. the insertion of the columnar connecting portion 18 into the tubular connecting portion 16 is finished. As is also understood from FIG. 8, the tapered portion 19*a* is provided with a press-fit region 43 to be press-fit to contact point portion 36 in the columnar connecting portion 18.

The tubular connecting portion 16 is gradually increased in diameter from a tip side (left side) toward a base end side (right side) in the inserting direction (lateral direction) of the columnar connecting portion 18, and provided with the contact point portion 36 in a lateral intermediate part of the tubular connecting portion 16. Thus, a part of the tubular connecting portion 16 closer to the base end side (right side) than the contact point portion 36 in the inserting direction of the columnar connecting portion 18 is gradually expanded in diameter toward an end part. That is, in the tubular connecting portion 16, an inner diameter $\phi\beta$ at an end part (right end part) on the base end side in the inserting direction of the columnar connecting portion 18 is larger than the inner diameter ϕα at the contact point portion 36. Here, an outer diameter at the press-fit region 43 is substantially equal to the inner diameter ϕα at the contact point portion 36 of the tubular connecting portion 16. Therefore, as shown in FIG. 7 to be described later, in the state where the tubular connecting portion 16 and the columnar connecting portion 18 are concentrically arranged when viewed in the lateral direction by aligning the center axis of the tubular connecting portion 16 and that of the columnar connecting portion 18, the press-fit region 43 can be passed toward the base end side of the tubular connecting portion 16 without contacting a part of the tubular connecting portion 16 closer to the base end side than the contact point portion 36.

In rear end parts of the first and second peripheral wall portions 28, 30 shaped as described above, end parts in the circumferential direction facing each other in the vertical direction are respectively first circumferential end parts 44, 44. This pair of first circumferential end parts 44, 44 are facing each other while being separated by a predetermined distance in the vertical direction. Further, in front end parts of the first and second peripheral wall portions 28, 30, end parts in the circumferential direction facing each other in the vertical direction are respectively second circumferential end parts 46, 46 serving as circumferential end parts. This pair of second circumferential end parts 46, 46 are facing each other while being separated by a predetermined distance in the vertical direction.

(Base End Side Plate Portions 48)

Figure 5:
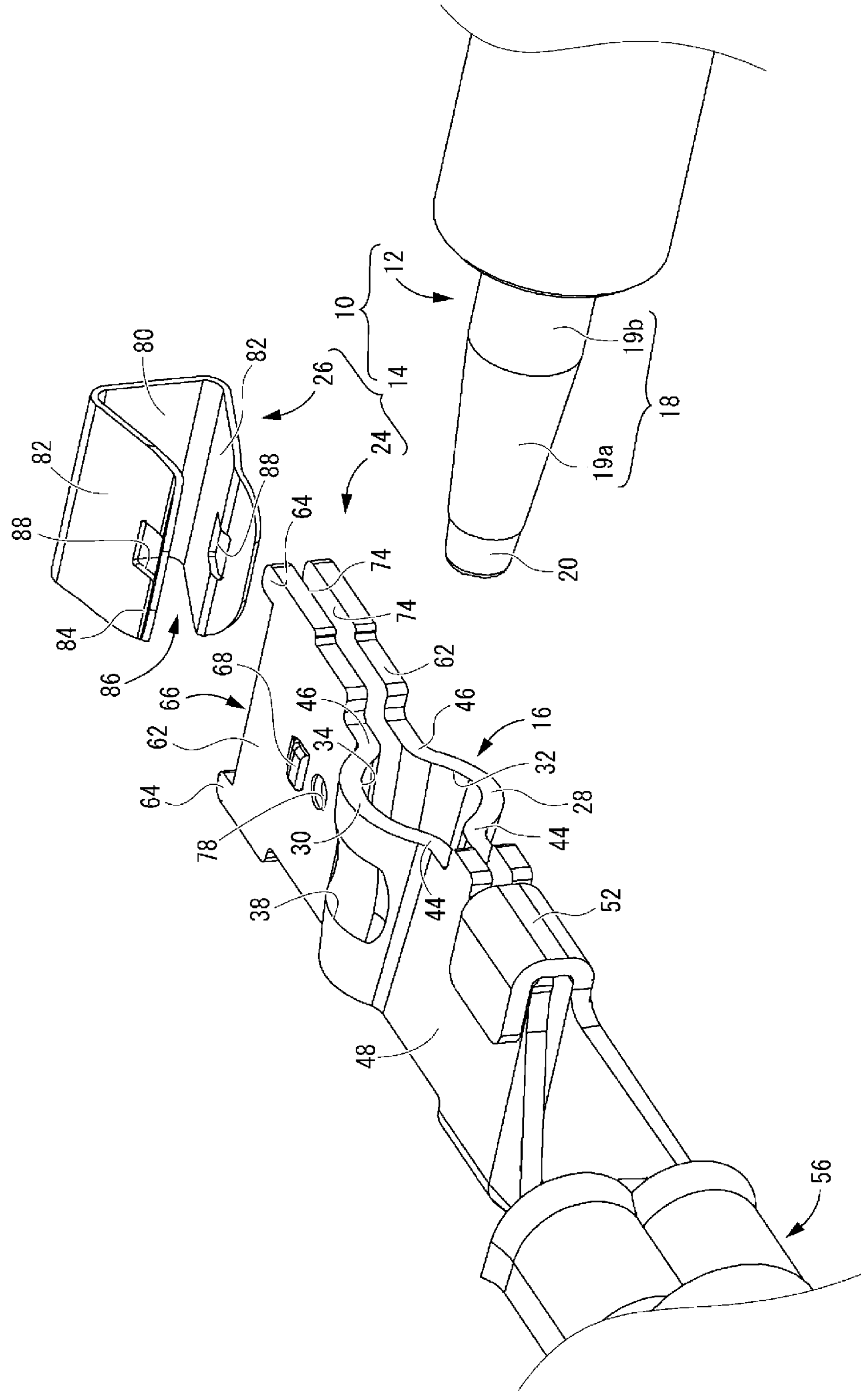
FIG. 5 is an exploded perspective view of the terminal unit shown in FIG. 1 from still another angle.

The pair of first circumferential end parts 44, 44 are provided with a pair of base end side plate portions 48, 48 projecting radially outwardly of the tubular connecting portion 16. As described above, the female terminal fitting 24 is formed by press-working the substantially strip-like metal flat plate, and the pair of base end side plate portions 48, 48 are coupled to each other at rear parts thereof. Each of the pair of base end side plate portions 48, 48 has a substantially rectangular shape when viewed in the vertical direction. The upper and lower base end side plate portions 48, 48 are coupled to each other by a coupling portion 50 located on a left side in rear end parts, and a crimping piece 52 projecting rightward is provided on the rear end part of the upper base end side plate portion 48. In this way, the lower base end side plate portion 48 is crimped and fixed to the upper base end side plate portion 48 as shown in FIG. 5 by bending the crimping piece 52 in forming the female terminal fitting 24 by press-working the metal flat plate. As a result, in the female terminal fitting 24 formed by press-working, the upper and lower base end side plate portions 48, 48 are not displaced in directions separating from each other.

A wire crimping portion 56 to be crimped to a wire 54 is provided in a part behind the base end side plate portions 48, 48. The wire 54 is a coated wire, and a core wire 58 is covered by an insulation coating 60. The wire crimping portion 56 provided in a rear end part of the female terminal 14 (female terminal fitting 24) is crimped to the core wire 58 exposed by stripping the insulation coating 60 at an end part of the wire 54. Note that a method for fixing the core wire 58 to the female terminal 14 (female terminal fitting 24) is not limited to crimping and may be, for example, adhesion, welding or the like. Note that the female terminal 14 may be fixed to a terminal portion of a device by a bolt or the like instead of the wire 54.

(Tip Side Plate Portions 62)

The pair of second circumferential end parts 46, 46 are provided with a pair of tip side plate portions 62, 62 respectively projecting radially outwardly (forwardly) of the tubular connecting portion 16. The pair of tip side plate portions 62, 62 have a substantially rectangular shape when viewed in the vertical direction and are separated from each other in the vertical direction. That is, in the female terminal 14, the base end side plate portions 48, 48 are coupled to the first and second peripheral wall portions 28, 30 on one side in a front-rear direction, and the tip side plate portions 62, 62 constitute free ends cantilevered while being separated from each other on the other side in the front-rear direction with respect to the first and second peripheral wall portions 28, 30. As a result, the tip side plate portions 62, 62 are deflectable and deformable in mutually approaching directions. A front end part of each of the tip side plate portions 62, 62 is provided with positioning protrusions 64, 64 projecting forward on both sides in the lateral direction. In other words, intermediate parts in the lateral direction are located behind the positioning protrusions 64, 64 in front end parts of the tip side plate portions 62, 62. A clip spring mounting portion 66, on which the clip spring 26 is mounted, is constituted by these intermediate parts in the lateral direction of the front end parts of the tip side plate portions 62, 62.

Protrusions 68, 68 projecting outward in the vertical direction are provided in central parts in a width direction on the outer surfaces of the tip side plate portions 62, 62 in the vertical direction. Each protrusion 68 has a substantially triangular or trapezoidal shape when viewed in the lateral direction, the rear surface of each protrusion 68 is a vertical surface 70 spreading substantially in the vertical direction, and the front surface of each protrusion 68 is an inclined surface 72 inclined to reduce a vertically outward projecting height toward the front.

(Stopper Portions 76)

Out of a pair of facing surfaces (i.e. vertically inner surfaces) 74, 74 of the pair of tip side plate portions 62, 62, at least one facing surface 74 is provided with a stopper portion 76 projecting toward the other facing surface 74. In this embodiment, the stopper portions 76, 76 are provided in central parts in the width direction of both of the pair of facing surfaces 74, 74, and facing each other while projecting inward in the vertical direction. Each stopper portion 76 is provided at a position closer to the tubular connecting portion 16 than a tip part of the tip side plate portion 62. In this embodiment, each stopper portion 76 is provided behind (closer to the tubular connecting portion 16 than) the protrusion 68 provided on the outer surface of the tip side plate portion 62. These stopper portions 76, 76 are formed by press-working the tip side plate portions 62, 62, and recesses 78, 78 open outward in the vertical direction are formed at positions corresponding to the stopper portions 76, 76 in the outer surfaces of the tip side plate portions 62, 62.

Further, in this embodiment, each stopper portion 76 has a flat cylindrical shape having a height (vertical dimension) smaller than an outer diameter. A projecting height of each of these stopper portions 76 is smaller than half the facing distance of the facing surfaces 74, 74. In this way, in the female terminal fitting 24 before the clip spring 26 is mounted, the both stopper portions 76, 76 do not contact each other. Further, when the clip spring 26 is mounted on the female terminal fitting 24, the stopper portions 76 come into contact with the facing surfaces 74 of the facing tip side plate portions 62, whereby displacements of the pair of tip side plate portions 62, 62 in the approaching directions are limited and the tip parts of the pair of tip side plate portions 62, 62 are maintained in a separated state. In this embodiment, since the stopper portions 76, 76 are provided on both of the pair of facing surfaces 74, 74 of the pair of tip side plate portions 62, 62, the stopper portions 76, 76 come into contact with each other and one stopper portion 76 indirectly comes into contact with the facing tip side plate portion 62 when the clip spring 26 is mounted on the female terminal fitting 24.

(Clip Spring 26)

The clip spring 26 serving as a resilient member for applying biasing forces to the first and second peripheral wall portions 28, 30 coupled behind the tip side plate portions 62, 62 in mutually approaching directions by biasing the tip side plate portions 62, 62 in the mutually approaching directions is mounted on the front end parts of the tip side plate portions 62, 62. The clip spring 26 is formed, using various metal materials, which can be press-worked or punched, such as strip plates of spring steel, stainless steel, brass, phosphor bronze, beryllium copper and the like.

The clip spring 26 includes a substantially rectangular coupling plate 80 when viewed in the front-rear direction, and a pair of pressing pieces 82, 82 projecting from both end parts of the coupling plate 80 toward one side in a plate thickness direction (lateral direction in FIGS. 2 and 6) of the coupling plate 80 and inclined in mutually approaching directions. A bent portion 84 is provided in an intermediate part in a length direction of each pressing piece 82. Projecting tip parts of the pressing pieces 82, 82 extend in mutually separating directions from the bent portions 84, 84. Therefore, a facing distance between the pressing pieces 82, 82 is shortest at the bent portions 84, 84 provided in the intermediate parts in the length direction, and a gap between these bent portions 84, 84 is an insertion opening 86 for the insertion of the female terminal fitting 24 into the clip spring 26. An opening dimension of the insertion opening of the clip spring 26 in a single state before being mounted on the female terminal fitting 24 is smaller than a vertical dimension of the female terminal fitting 24 in a single state. Further, substantially rectangular locking recesses 88 penetrating through the pressing pieces 82 in the plate thickness direction are formed in widthwise centers of the bent portions 84, 84 of the pair of pressing pieces 82, 82.

(Assembly of Female Terminal Fitting 24 and Clip Spring 26)

The clip spring 26 shaped as described above is assembled with the pair of tip side plate portions 62, 62 from front. That is, the tip side plate portions 62, 62 of the female terminal fitting 24 are inserted into the insertion opening 86 in the clip spring 26, and the clip spring 26 is slid and displaced rearward with respect to the female terminal fitting 24. In this way, the pair of pressing pieces 82, 82 in the clip spring 26 sandwich the tip side plate portions 62, 62 of the female terminal fitting 24 from outer sides in the vertical direction. Then, the respective protrusions 68 projecting outward in the vertical direction from the tip side plate portions 62, 62 are locked into the respective locking recesses 88 in the clip spring 26. In this way, the clip spring 26 is assembled with the pair of tip side plate portions 62, 62 with the tip parts (front end parts) of the pair of tip side plate portions 62, 62 sandwiched between the pair of pressing pieces 82, 82. As a result, the female terminal 14 is completed.

Since the front surfaces of the respective protrusions 68 are the inclined surfaces 72 and projecting tip parts of the pressing pieces 82, 82 are inclined in mutually separating directions, the projecting tip parts of the pressing pieces 82, 82 can easily ride over the respective protrusions 68. Further, the respective locking recesses 88 are stably locked by the vertical surfaces 70, which are the rear surfaces of the respective protrusions 68.

Note that, as described above, the clip spring mounting portion 66 is provided in the intermediate part in the lateral direction of the front end part of the female terminal fitting 24. In this way, when the clip spring 26 is mounted on the clip spring mounting portion 66, the positioning protrusions 64, 64 provided on the tip side plate portions 62, 62 are located on both sides in the lateral direction of the coupling plate 80 as also shown in FIGS. 1 and 2. As a result, in an assembled state of the female terminal fitting 24 and the clip spring 26, the clip spring 26 is prevented from being shifted in position in the lateral direction with respect to the female terminal fitting 24.

Here, since the opening dimension of the insertion opening 88 in the clip spring 26 is smaller than the vertical dimension of the female terminal fitting 24 (tip side plate portions 62, 62), the tip side plate portions 62, 62 push and expand the insertion opening 86 of the clip spring 26 outward in the vertical direction and the pressing pieces 82, 82 are resiliently deformed in the mutually separating directions when the clip spring 26 is mounted on the front end parts of the tip side plate portions 62, 62. In this way, the clip spring 26 is assembled with the front end parts of the tip side plate portions 62, 62. Resilient restoring forces of these pressing pieces 82, 82 are applied as biasing forces in the mutually approaching directions to the front end parts of the tip side plate portions 62, 62. That is, parts of the tip side plate portions 62, 62 to be brought into contact with the bent portions 84 of the respective pressing pieces 82 in the clip spring 26 are biasing force applying parts by the clip spring 26. In this embodiment, since the bent portions 84, 84 are provided with the locking recesses 88, 88 in the pressing pieces 82, 82 of the clip spring 26, parts of the tip side plate portions 62, 62 where the protrusions 68, 68 to be locked into the locking recesses 88, 88 are formed are the biasing force applying parts by the clip spring 26.

Further, by applying the biasing forces in the mutually approaching directions to the tip side plate portions 62, 62, the second circumferential end parts 46, 46 in the first and second peripheral wall portions 28, 30 coupled behind the tip side plate portions 62, 62 are biased in the mutual approaching directions. In this way, the stopper portions 76, 76 provided on the facing surfaces 74, 74 of the tip side plate portions 62, 62 come into contact with each other. As a result, when the both stopper portions 76, 76 come into contact, the tip parts of the tip side plate portions 62, 62 are separated from each other without coming into contact with each other. Further, it can be suppressed by the contact of the both stopper portions 76, 76 that the inner diameter of the tubular connecting portion 16 becomes excessively small. By inserting the columnar connecting portion 18 into the tubular connecting portion 16 shaped as just described and applying outward external forces in the vertical direction to the tip side plate portions 62, 62 and the first and second peripheral wall portions 28, 30, the tip side plate portions 62, 62 and the first and second peripheral wall portions 28, 30 are displaced in the mutually separating directions against the biasing forces of the pressing pieces 82, 82.

(Connection of Male Terminal 12 and Female Terminal 14)

A method for connecting the male and female terminals 12, 14 by inserting the columnar connecting portion 18 of the male terminal 12 into the tubular connecting portion 16 of the female terminal 14 shaped as described above is described, using a model shown in FIGS. 7 and 8. Note that the figure on the upper side of FIG. 8 shows a state at a point of time when the connection is started by inserting (press-fitting) the columnar connecting portion 18 into the tubular connecting portion 16, and the figure on the lower side of FIG. 8 shows a state at a point of time when the connection of the columnar connecting portion 18 to the tubular connecting portion 16 is finished.

First, as shown in FIG. 7, the center axis of the tubular connecting portion 16 and that of the columnar connecting portion 18 are aligned with each other by arranging the tubular connecting portion 16 of the female terminal 14 and the columnar connecting portion 18 of the male terminal 12 in a state separated in the front-rear direction. In this way, the tubular connecting portion 16 and the columnar connecting portion 18 are respectively concentrically arranged when viewed in the lateral direction. Note that such an alignment of the tubular connecting portion 16 and the columnar connecting portion 18 may be achieved, for example, by a guide or the like for centering provided in at least one of a male connector and a female connector in a connector unit including the unillustrated male connector for accommodating the male terminal 12 and the unillustrated female connector for accommodating the female terminal 14. Further, in such a connector unit, the insertion of the columnar connecting portion 18 into the tubular connecting portion 16 described below may be achieved by tightening a connection bolt provided in the connector unit.

Then, the columnar connecting portion 18 is inserted into the tubular connecting portion 16 from right to left. At that time, any of the outer diameters ϕA, ϕC and ϕD at the tip part of the columnar connecting portion 18 and the insulating member 20 is sufficiently smaller than the inner diameter ϕB at the end part (right end part) of the tubular connecting portion 16 on the base end side in the inserting direction of the columnar connecting portion 18. Thus, the tip part of the columnar connecting portion 18 and the insulating member 20 can be inserted without contacting the part of the tubular connecting portion 16 closer to the base end side than the contact point portion 36 in the inserting direction. Even if one of the first and second peripheral wall portions 28, 30 contacts, for example, the tip part of the columnar connecting portion 18 and the insulating member 20, the tip part of the columnar connecting portion 18 and the insulating member 20 are largely separated from the other of the first and second peripheral wall portions 28, 30. Therefore, the tip part of the columnar connecting portion 18 and the insulating member 20 are inserted into the tubular connecting portion 16 along the inner surface of the one of the first and second peripheral wall portions 28, 30 without being accompanied by a large insertion resistance force, i.e. without being press-fit.

By further inserting the columnar connecting portion 18 into the tubular connecting portion 16, the insulating member 20 and the tip part of the columnar connecting portion 18 pass through the contact point portion 36 of the tubular connecting portion 16. Also at that time, the inner diameter ϕα at the contact point portion 36 of the tubular connecting portion 16 is larger than the outer diameters ϕA, ϕC and ϕD at the tip part of the columnar connecting portion 18 and the insulating member 20. Thus, the tip part of the columnar connecting portion 18 and the insulating member 20 can be inserted without contacting the contact point portion 36 of the tubular connecting portion 16. Even if the tip part of the columnar connecting portion 18 and the insulating member 20 contact the contact point portion 36, there is a gap between the tip part of the columnar connecting portion 18 and the insulating member 20 and the first peripheral wall portion 28. Therefore, the tip part of the columnar connecting portion 18 and the insulating member 20 are inserted into the tubular connecting portion 16 along the curved surface 40, which is the inner surface of the contact point portion 36, without being accompanied by a large insertion resistance force, i.e. without being press-fit.

By further inserting the columnar connecting portion 18 into the tubular connecting portion 16, the tubular connecting portion 16 and the columnar connecting portion 18 are fit as shown in the figure on the upper side of FIG. 8 at a certain point of time. Specifically, the part having the outer diameter ϕα in the tapered portion 19*a* of the columnar connecting portion 18 contacts the linear contact portions 42, 42 of the first peripheral wall portion 28 on the upper side and contacts the contact point portion 36 of the second peripheral wall portion 30 on the lower side. From this point of time, the press-fitting of the columnar connecting portion 18 into the tubular connecting portion 16 is started.

That is, by further inserting the columnar connecting portion 18 into the tubular connecting portion 16 from a point of time indicated in the figure on the upper side of FIG. 8, the first and second peripheral wall portions 28, 30 are pushed and expanded outward in the vertical direction by the outer peripheral surface of the tapered portion 19*a* in the columnar connecting portion 18. In this way, the first and second peripheral wall portions 28, 30 are displaced in the mutually separating directions against the biasing forces of the pressing pieces 82, 82 of the clip spring 26. As a result, further insertion of the columnar connecting portion 18 into the tubular connecting portion 16 is enabled.

At a point of time when the columnar connecting portion 18 is displaced by a predetermined distance L (see FIG. 8) in the inserting direction into the tubular connecting portion 16 from a state at the start of the fitting or the insertion resistance of the columnar connecting portion 18 into the tubular connecting portion 16 becomes sufficiently large by inserting the columnar connecting portion 18 into the tubular connecting portion 16, a state at the end of the fitting is reached and the connection of the male and female terminals 12, 14 is completed as shown in the figure on the lower side of FIG. 8. At a point of time at the end of the fitting shown in the figure on the lower side of FIG. 8, an inner diameter ϕα' at the contact point portion 36 of the tubular connecting portion 16 is slightly larger than the inner diameter ϕα at the contact point portion 36 of the tubular connecting portion 16 at the point of time in the figure on the upper side of FIG. 8 since the first and second peripheral wall portions 28, 30 are respectively pushed and expanded outward in the vertical direction as compared to the point of time in the figure on the upper side of FIG. 8. That is, a part having the outer diameter of from ϕα to ϕα' in the tapered portion 19*a* of the columnar connecting portion 18 is the press-fit region 43 to be press-fit to the contact point portion 36.

ϕα', which is a maximum outer diameter of this press-fit region 43, is smaller than an inner diameter of the part closer to the base end side than the contact point portion 36 of the tubular connecting portion 16 in the inserting direction of the columnar connecting portion 18 (e.g. inner diameter ϕβ at the right end part of the tubular connecting portion 16). In this way, when the tubular connecting portion 16 and the columnar connecting portion 18 are concentrically arranged when viewed in the lateral direction and the columnar connecting portion 18 is inserted into the tubular connecting portion 16, it is avoided that the press-fit region 43 contacts the part closer to the base end side than the contact point portion 36 of the tubular connecting portion 16 in the inserting direction of the columnar connecting portion 18. Even if the press-fit region 43 contacts the part of the tubular connecting portion 16 closer to the base end side than the contact point portion 36 in the inserting direction of the columnar connecting portion 18, it is avoided that the columnar connecting portion 18 is inserted press-fit.

In inserting the columnar connecting portion 18 into the tubular connecting portion 16 in the terminal unit 10 of this embodiment, inward biasing forces in the vertical direction are applied to the first and second peripheral wall portions 28, 30 by the pressing pieces 82, 82 of the clip spring 26 and the columnar connecting portion 18 is inserted press-fit into the tubular connecting portion 16. As a result, a contact pressure between the tubular connecting portion 16 and the columnar connecting portion 18 can be improved.

Further, since both the columnar connecting portion 18 and the tubular connecting portion 16 have a tapered shape, it is avoided that the columnar connecting portion 18 is press-fit into the tubular connecting portion 16 in a state immediately after the columnar connecting portion 18 is inserted into the tubular connecting portion 16, specifically until the part having the outer diameter $\phi\alpha$ in the tapered portion 19*a* of the columnar connecting portion 18 contacts the contact point portion 36 of the tubular connecting portion 16. Since both the columnar connecting portion 18 and the tubular connecting portion 16 have a tapered shape, the columnar connecting portion 18 and the tubular connecting portion 16 can be brought into contact with a sufficiently large contact area by displacing the columnar connecting portion 18 only by a relatively short distance (L in FIG. 8 in this embodiment) in the inserting direction. In this embodiment, since the taper angle $\theta_1$ of the tubular connecting portion 16 and the taper angle $\theta_2$ in the tapered portion 19*a* of the columnar connecting portion 18 are substantially equal, a larger contact area between the tubular connecting portion 16 and the columnar connecting portion 18 can be more reliably secured.

That is, in the terminal unit 10 of this embodiment, the tubular connecting portion 16 and the columnar connecting portion 18 are not press-fit until being fit and the insertion resistance of the columnar connecting portion 18 into the tubular connecting portion 16 is reduced. A moving distance of the columnar connecting portion 18 in the inserting direction under the press-fit state can be suppressed to be small and a sufficient contact area between the columnar connecting portion 18 and the tubular connecting portion 16 can be secured at the end of the fitting. Therefore, for example, if a columnar connecting portion and a tubular connecting portion are respectively formed into a straight shape, a moving distance of the columnar connecting portion in an inserting direction tends to be long to secure a contact area, resulting in a possible problem that the plating provided on the columnar connecting portion and the tubular connecting portion is scraped off. However, in the terminal unit 10 of this embodiment, such a problem can be solved.

Note that if the insertion of the columnar connecting portion 18 into the tubular connecting portion 16 is achieved by tightening the connection bolt in the aforementioned connector unit, an insertion distance of the columnar connecting portion 18 can be shortened. Thus, it is possible to shorten a length of the connection bolt and reduce a tightening amount of the connection bolt. That is, a bolt tightening time by the connection bolt can be also shortened and work efficiency in a connecting operation of the male and female connectors can be improved.

In the tubular connecting portion 16, the contact point portion 36 in the form of an arcuate projection extending in the circumferential direction is provided on the inner surface 34 of the second peripheral wall portion 30. In this way, the outer surface of the columnar connecting portion 18 and the inner surface 34 of the second peripheral wall portion 30 can be brought into contact with a relatively large contact area. Further, in the tubular connecting portion 16, the linear contact portions 42, 42 extending in the axial direction of the tubular connecting portion 16 are provided on the inner surface 32 of the first peripheral wall portion 28. In this way, a contact state of the columnar connecting portion 18 and the tubular connecting portion 16 is maintained even if the columnar connecting portion 18 is rocked or twisted with respect to the tubular connecting portion 16.

Particularly, the columnar connecting portion 18 contacts the central part in the circumferential direction of the inner surface 34 of the second peripheral wall portion 30 on the lower side of the tubular connecting portion 16, and the columnar connecting portion 18 contacts the inner surface 32 of the first peripheral wall portion 28 at two positions separated on both end sides in the circumferential direction from the central part in the circumferential direction of the inner surface 32 on the upper side of the tubular connecting portion 16. In this way, the columnar connecting portion 18 can be supported at three points on the circumference of the inner surface of the tubular connecting portion 16, and a connected state of the male and female terminals 12, 14 is stably maintained. Further, on the inner surface of the contact point portion 36, the surface on the front side (right side) in the inserting direction of the male terminal 12 is the curved surface 40. Therefore, the insertion resistance in inserting the male terminal 12 into the female terminal 14 can be reduced and an effect of preventing the plating scraping-off can be more achieved. The pair of tip side plate portions 62, 62 in the female terminal 14 are provided with the stopper portions 76, 76 facing each other. In this way, it can be suppressed that the inner diameter of the tubular connecting portion 16 becomes excessively small and the tip parts of the pair of tip side plate portions 62, 62 can be maintained in a separated state when the clip spring 26 is mounted on the pair of tip side plate portions 62, 62. As a result, the insertion resistance when the columnar connecting portion 18 is inserted into the tubular connecting portion 16 can be reduced. Further, when the columnar connecting portion 18 is inserted into the tubular connecting portion 16, a separation distance between the tip parts of the pair of tip side plate portions 62, 62 can be increased. In this way, even if the connected state of the tubular connecting portion 16 and the columnar connecting portion 18 continues for a long period of time and the tip parts of the pair of tip side plate portions 62, 62 are deformed in the mutually approaching directions due to stress relaxation, the mutual contact of the tip parts of the pair of tip side plate portions 62, 62 can be avoided. As a result, the biasing forces by the clip spring 26 can be stably applied to the tubular connecting portion 16 and the connected state of the male and female terminals 12, 14 can be continuously maintained for a long period of time.

The insulating member 20 is provided on the tip part of the columnar connecting portion 18 and a possibility of electric shock associated with accidental contact with the columnar connecting portion 18 can be reduced. The maximum outer diameter $\phi D$ of the insulating member 20 is smaller than the outer diameter $\phi A$ of the tip part of the columnar connecting portion 18. In this way, even if the insulating member 20 is formed to be slightly larger, for example, due to manufacturing errors or the like, the outer surface of the columnar connecting portion 18 and the inner surface of the tubular connecting portion 16 can be more reliably brought into contact. Further, it is possible to reduce, for example, a possibility of the scraping-off of the plating provided on the inner surface of the tubular connecting portion 16 due to a sliding movement of the outer surface of the insulating member 20 against the inner surface of the tubular connecting portion 16.

Modifications

Although the embodiment has been described in detail as a specific example of the present disclosure above, the present disclosure is not limited to this specific description. The present disclosure includes modifications, improvements and the like within a range in which the object of the present disclosure can be achieved. For example, the following modifications of the embodiment are also included in the technical scope of the present disclosure.

(1) In the above embodiment, the first peripheral wall portion 28 constituting the tubular connecting portion 16 is provided with the linear contact portions 42 and the second peripheral wall portion 30 is provided with the contact point portion 36 in the form of an arcuate projection. However, for example, both first and second peripheral wall portions may be provided with the linear contact portions or may be provided with contact point portions in the form of arcuate projections. In the case of providing the linear contact portions, the linear contact portion may be provided at one position on the circumference or the linear contact portions may be provided apart from each other in the circumferential direction at three or more positions on the circumference on the inner surface(s) of the first and/or second peripheral wall portions.

(2) Although the stopper portion 76 is provided between the protrusion 68 and the tubular connecting portion 16 in the front-rear direction of the tip side plate portion 62 in the above embodiment, a stopper portion may be, for example, provided on a side closer to the tip than the protrusion 68. Note that the stopper portion is not essential in the present disclosure.

(3) Although the resilient member is constituted by the clip spring 26 in the above embodiment, a coil spring, an annular resilient body or the like may be, for example, adopted as the resilient member and bias the first and second peripheral wall portions in the mutual approaching directions. Also in such a mode, the female terminal can be brought into contact with the male terminal with a predetermined contact pressure by inserting the columnar connecting portion into the tubular connecting portion against biasing forces of the resilient member.

LIST OF REFERENCE NUMERALS

10 terminal unit
12 male terminal
14 female terminal
16 tubular connecting portion
18 columnar connecting portion
19*a* tapered portion
19*b* straight portion
20 insulating member
22 step surface
24 female terminal fitting
26 clip spring (resilient member)
28 first peripheral wall portion
30 second peripheral wall portion
32 inner surface (of first peripheral wall portion)
34 inner surface (of second peripheral wall portion)
36 contact point portion
38 recess
40 curved surface
42 linear contact portion
43 press-fit region
44 first circumferential end part
46 second circumferential end part (circumferential end part)
48 base end side plate portion
50 coupling portion
52 crimping piece
54 wire
56 wire crimping portion
58 core wire
60 insulation coating
62 tip side plate portion
64 positioning protrusion
66 clip spring mounting portion
68 protrusion
70 vertical surface
72 inclined surface
74 facing surface
76 stopper portion
78 recess
80 coupling plate
82 pressing piece
84 bent portion
86 insertion opening
88 locking recess

What is claimed is:

1. A terminal unit, comprising:

a male terminal; and a female terminal, the male terminal including a columnar connecting portion extending while having a circular cross-section, the columnar connecting portion having a tapered shape gradually reduced in diameter toward a tip side, the female terminal including a tubular connecting portion to be conductively connected to the columnar connecting portion of the male terminal and having a first peripheral wall portion and a second peripheral wall portion arranged to face each other, and a resilient member for biasing the first and second peripheral wall portions in mutually approaching directions, the first and second peripheral wall portions being displaceable away from each other against a biasing force of the resilient member, a facing gap between the first and second peripheral wall portions becoming gradually smaller from a base end side toward a tip side of the tubular connecting portion in an inserting direction of the columnar connecting portion into the tubular connecting portion, at least one of the first and second peripheral wall portions including a contact point portion located between the base end side and the tip side and projecting radially inward, a tip part of the columnar connecting portion having an outer diameter to be insertable into the tubular connecting portion without contacting the contact point portion with the columnar connecting portion and the tubular connecting portion concentrically arranged, a press-fit region to be press-fit to the contact point portion being provided on a part of the columnar connecting portion closer to the base end side than the tip part, the female terminal including a pair of tip side plate portions, the pair of tip side plate portions projecting radially outwardly of the tubular connecting portion from a pair of mutually facing circumferential end parts of the first and second peripheral wall portions while being separated from each other, the pair of tip side plate portions being deflectable and deformable in mutually approaching directions, the resilient member biasing the pair of tip side plate portions in the mutually approaching directions, and at least one of a pair of facing surfaces of the pair of tip side plate portions being provided with a stopper portion projecting toward the other facing surface at a position closer to the tubular connecting portion than tip parts of the tip side plate portions.

2. The terminal unit of claim 1, wherein:

both the first and second peripheral wall portions have an inner surface having an arcuate cross-section, and the contact point portion in the form of an arcuate projection projecting radially inward while extending in a circumferential direction of the inner surface is provided on the inner surface of at least one of the first and second peripheral wall portions.

3. The terminal unit of claim 2, wherein:

the contact point portion in the form of an arcuate projection is provided on the inner surface of one of the first and second peripheral wall portions, and linear contact portions projecting radially inward while extending in an axial direction of the tubular connecting portion are provided at a plurality of positions separated in the circumferential direction on the inner surface of the other of the first and second peripheral wall portions.

4. The terminal unit of claim 1, wherein the male terminal includes a columnar insulating member mounted on the tip part of the columnar connecting portion and gradually reduced in diameter toward a tip and a maximum outer diameter of the insulating member is smaller than an outer diameter of the tip part of the columnar connecting portion.

* * * * *